United States Patent
Weng (10) Patent No.: US 8,692,484 B2
(45) Date of Patent: Apr. 8, 2014

(54) AUTOMATIC LIGHT REGULATING POWER SUPPLY DEVICE

(75) Inventor: Linsong Weng, Hsinchu County (TW)

(73) Assignees: Ginger Technology Co., Ltd., Hsinchu County (TW); Linsong Weng, Hsinchu County (TW)

( * ) Notice: Subject to any disclaimer, the term of this patent is extended or adjusted under 35 U.S.C. 154(b) by 147 days.

(21) Appl. No.: 13/304,455

(22) Filed: Nov. 25, 2011

(65) Prior Publication Data

US 2013/0134874 A1    May 30, 2013

(51) Int. Cl.
*H05B 37/02*    (2006.01)

(52) U.S. Cl.
USPC .......................................... 315/307; 315/152

(58) Field of Classification Search
USPC .............. 315/307, 185 R, 192, 210, 312, 152
See application file for complete search history.

(56) References Cited

U.S. PATENT DOCUMENTS

| | | | |
|---|---|---|---|
| 2007/0273290 A1* | 11/2007 | Ashdown et al. | 315/113 |
| 2009/0189530 A1* | 7/2009 | Ashdown et al. | 315/152 |

* cited by examiner

*Primary Examiner* — Daniel D Chang
(74) *Attorney, Agent, or Firm* — Rosenberg, Klein & Lee (57) ABSTRACT

An automatic light regulating power supply device, connected between an AC power supply and a light-emitting-diode (LED) light string, to drive said LED light string to emit light, comprising: a sensing-and-setting unit, and a digital power control unit. Wherein, the sensing-and-setting unit is used to sense infrared signals, and generate a plurality of brightness selection signal. An AC/DC conversion circuit is provided in the digital power control unit, to convert the received AC power into DC power and output the DC power. The digital power control unit is connected to the sensing-and-setting unit, and regulates its power output based on infrared signals of the sensing-and-setting unit and the brightness selection signals, to vary illumination of the LED light string, in achieving energy conservation and lower power consumption.

23 Claims, 11 Drawing Sheets

AUTOMATIC LIGHT REGULATING POWER SUPPLY DEVICE

BACKGROUND OF THE INVENTION

1. Field of the Invention

The present invention relates to an automatic light regulating power supply device, and in particular to an automatic light regulating power supply device connected directly to a local AC power supply, to control the LED light string for emitting lights of different brightnesses.

2. The Prior Arts

With the increase of standard of living, the living quarters design is essential and is progressing rapidly. In this respect, lighting design is getting more emphasis and attention, to match it with aesthetical appeal of living space to achieve harmony. As such, Light-Emitting-Diode (LED) lighting device has become a mainstay in the market for its various advantages of long service life, power conservation, low failure rate, stable light emission, high illumination efficiency, and compatible with various lighting devices, as compared with the conventional tungsten-filament light bulbs.

An ordinary LED lighting device is composed mainly of a small-sized Light Emitting Device (LED) light tube, and a power supply device, for which light emission is realized through driving the LED light tube with DC power converted from AC power as supplied by the power supply device. In such a design, the LED lighting device has only two modes of operations: a lighting mode and a non-lighting mode depending on whether power is supplied. As such, it is inferior to the conventional tungsten-filament light bulbs in that, that can be regulated to have various degrees of light illuminations depending on the amount of power supplied. Therefore, the conventional LED lighting device is not able to fulfill the requirement of user putting emphases on living quality and energy conservation, that light illumination can be adjusted to create a suitable atmosphere according to the times and occasions as required. In addition, the LED lighting device having only lighting and non-lighting modes tends to cause waste of energy that limits its application, thus it is not practicable and convenient for most of the stores and households putting emphases on creating a good atmosphere to use it for illumination purpose, also it is not able to fulfill the requirement of energy conservation of the modern times.

Moreover, the LED lighting device can only be driven by DC power as its power supply. Presently, ordinary stores and households all utilize AC power supplied by the local power company, so the front end of conventional LED lighting device must be connected to an LED power supply device to perform the power conversion as required, so that not only its application is limited, but its production cost is also increased.

Therefore, presently, the design and performance of LED lighting device is not quite satisfactory, and it has much room for improvements. There is an urgent need to develop a LED power control technology able to solve the above-mentioned problems.

SUMMARY OF THE INVENTION

In view of the problems and shortcomings of the prior art, the present invention provides an automatic light regulating power supply device, for which light illumination can be varied depending on the amount of power supplied, so as to solve the problem of the prior art.

A major objective of the present invention is to provide an automatic light regulating power supply device, connected between a local AC power supply and an LED light string, for converting AC power to DC power to drive the LED light string to emit light; meanwhile, it can regulate its power output through sensing the infrared signals in its surroundings, so as to regulate the light illumination of the LED light string.

Another objective of the present invention is to provide an automatic light regulating power supply device, which is advantageous of regulating light illumination of LED light string based on the infrared signal and brightness of the surrounding, to achieve the objective of energy conservation.

A yet another objective of the present invention is to provide an automatic light regulating power supply device, wherein, at least a sensor and/or at least a digital power control unit are provided to achieve brightness control and regulation in groups.

In order to achieve the above-mentioned objective, the present invention provides an automatic light regulating power supply device, connected between an AC power supply and an LED light string, for converting an AC power to DC power to drive the LED light string to emit light, comprising: a sensing-and-setting unit, and a digital power control unit. Wherein, the sensing-and-setting unit is used to sense an infrared signal, and generates a plurality of brightness selection signals. An AC/DC conversion circuit is provided inside the digital power control unit, to convert the AC power into DC power, and then output the DC power. In this way, the digital power control unit is connected to the sensing-and-setting unit, and it regulates its output power based on the infrared signal and the brightness selection signals coming from the sensing-and-setting unit, to vary the light illumination of the LED light string.

According to an embodiment of the present invention, the digital power control unit includes: a low voltage power supply circuit connected to the AC/DC conversion circuit; an output power control signal processing unit connected to the sensing-and-setting unit; an output power conversion and filtering circuit connected to the LED light string; and an output power control unit. Wherein, the AC/DC conversion circuit is connected to the output power control unit, the low voltage power supply circuit, and the AC power supply; and the output power control unit is connected to the AC/DC conversion circuit, the output power conversion and filtering circuit, and the output power control signal processing unit.

In the descriptions mentioned above, the AC/DC conversion circuit includes an EMI filter circuit, a rectifying circuit, and a power factor adjusting circuit. The EMI filter circuit is connected to the AC power supply, the power factor adjusting circuit is connected to the output power control unit, and the rectifying circuit is connected between the EMI filter circuit and the power factor adjusting circuit.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention provides an automatic light regulating power supply device, which receives local AC power supply directly to drive the LED light string, and control the light brightness of the LED light string.

Such an automatic, light regulating power supply device performs light illumination regulation based on the infrared signal and the environmental brightness, in achieving energy conservation.

Figure 1:
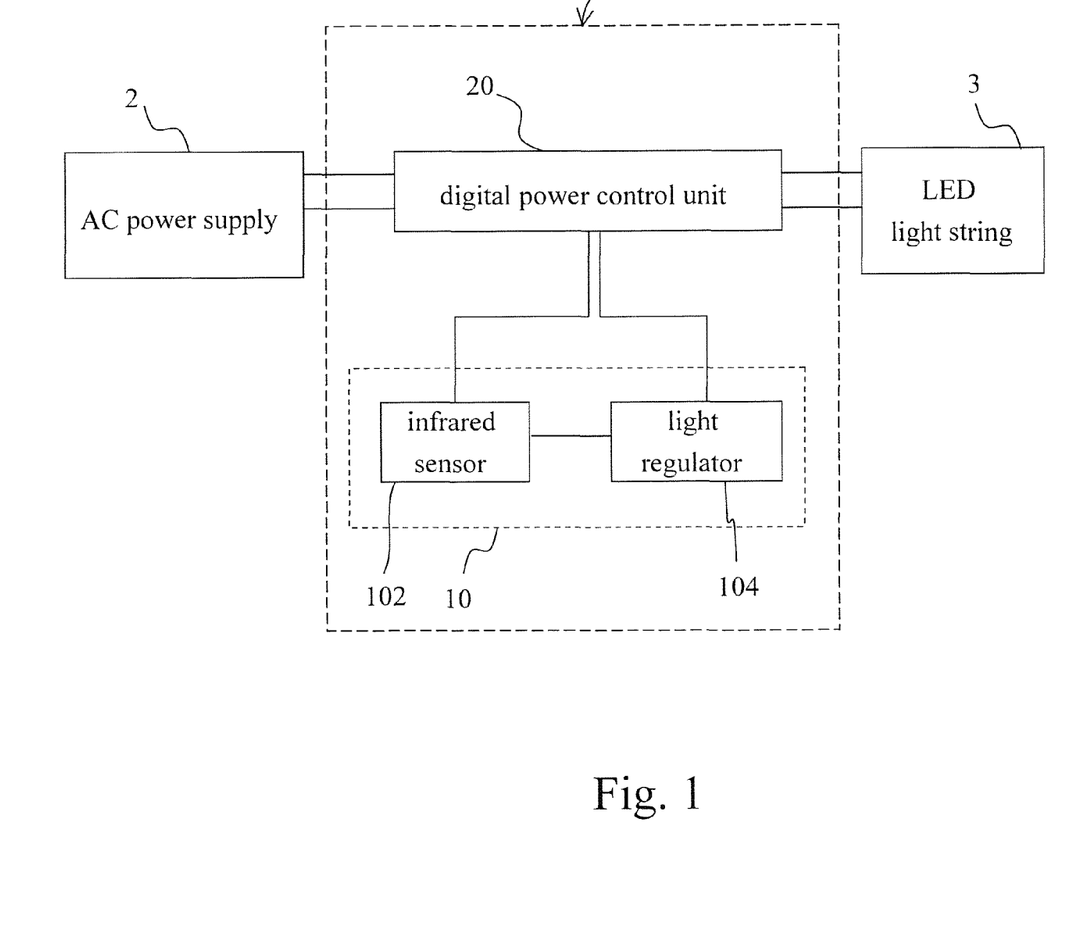
FIG. 1 is a block diagram of an automatic light regulating power supply device according to an embodiment of the present invention.

Refer to FIG. 1 for a block diagram of an automatic light regulating power supply device according to an embodiment of the present invention. As shown in FIG. 1, an automatic light regulating power supply device 1 is connected between an AC power supply 2 and an LED light string 3, to drive the LED light string 3 to emit light.

According to an embodiment of the present invention, the automatic light regulating power supply device 1 includes: a sensing-and-setting unit 10, and a digital power control unit 20. Wherein, an infrared sensor 102 and a light regulator 104 are provided in the sensing-and-setting unit 10, to sense the infrared signal in the surroundings, and generate a plurality of brightness selection signals. The digital power control unit 20 is connected to the sensing-and-setting unit 10, and it regulates its output power based on the infrared signal and the brightness selection signals coming from the sensing-and-setting unit 10, to vary the light illumination of the LED light string 3.

Figure 2:
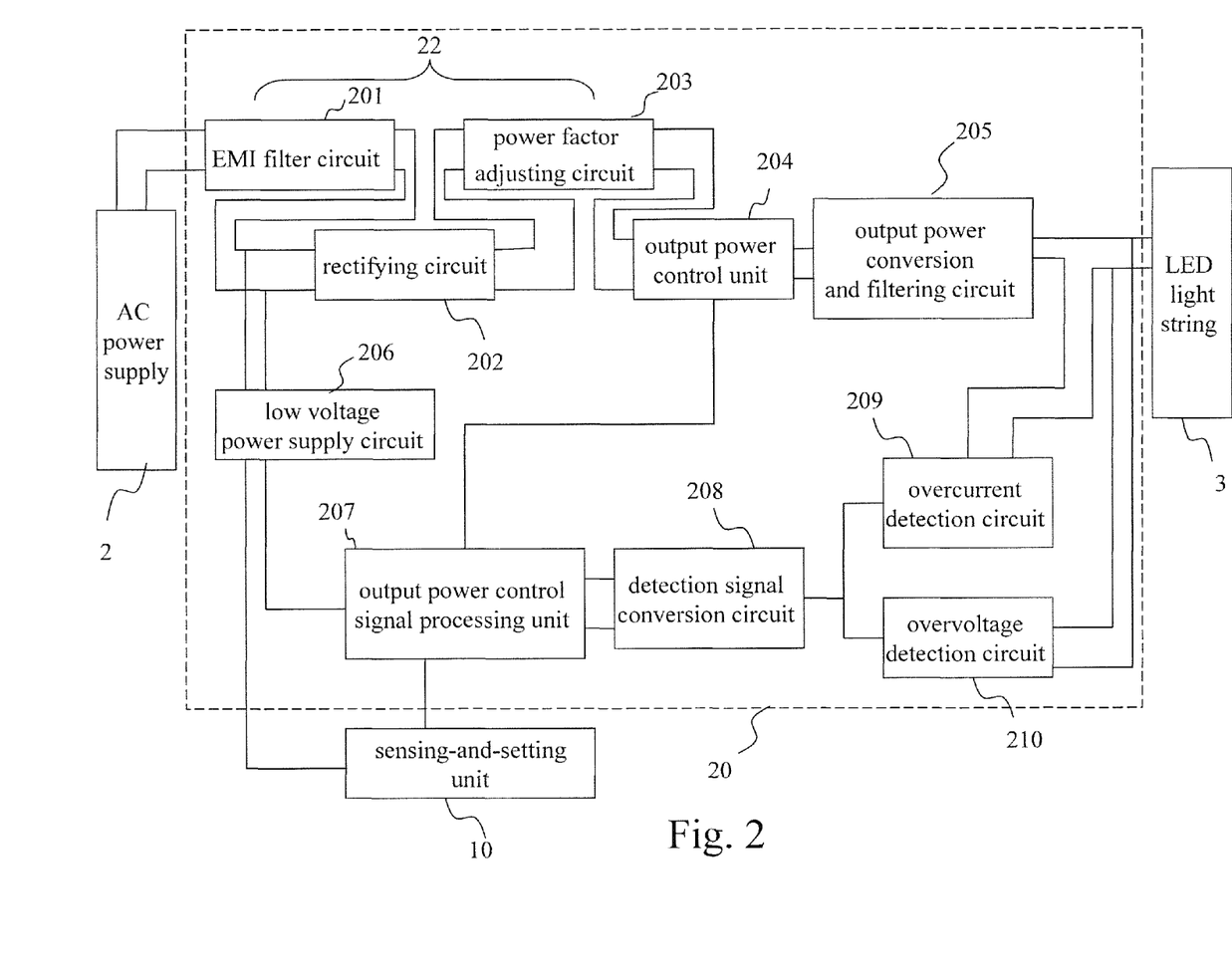
FIG. 2 is a block diagram of a digital power control unit according to an embodiment of the present invention.

As shown in FIG. 2, an AC/DC conversion circuit 22 is provided in the digital power control unit 20, to convert AC power supply 2 to DC power to drive the LED light string 3. As such, the automatic light regulating power supply device 1 can receive the local AC power supply, to drive LED light string 3 to emit light.

Refer to FIG. 2 for a block diagram of a digital power control unit 20 according to an embodiment of the present invention. As shown in FIG. 2, the digital power control unit 20 includes: an AC/DC conversion circuit 22, a output power control unit 204, a output power conversion and filtering circuit 205, a low voltage power supply circuit 206, a output power control signal processing unit 207, a detection signal conversion circuit 208, an overcurrent detection circuit 209, and an overvoltage detection circuit 210.

In the descriptions mentioned above, the AC/DC conversion circuit 22 includes: an EMI filter circuit 201, a rectifying circuit 202, and a power factor adjusting circuit 203. The EMI filter circuit 201 is connected to AC power supply 2, to filter out noise of high frequency in the local power supply. The power factor adjusting circuit 203 is connected to the output power control unit 204; and the rectifying circuit 202 is connected between the EMI filter circuit 201 and the power factor adjusting circuit 203. As such, the digital power control unit 20 receives and converts AC power supply 2 into DC power through the AC/DC conversion circuit 22, to drive the LED light string 3 to emit light.

Furthermore, according to an embodiment of the present invention, a low voltage power supply circuit 206 is connected to the EMI filter circuit 201, the output power control signal processing unit 207, and the sensing-and-setting unit 10; the output power control signal processing unit 207 is connected to the sensing-and-setting unit 10; the output power conversion and filtering circuit 205 is connected to the LED light string 3; and the output power control unit 204 is connected to the power factor adjusting circuit 203, the output power control signal processing unit 207, and the output power conversion and filtering circuit 205.

The detection signal conversion circuit 208 is connected to the output power control signal processing unit 207; the overcurrent detection circuit 209 and the overvoltage detection circuit 210 are connected in parallel, and each of them is connected to the detection signal conversion circuit 208, the output power conversion and filtering circuit 205, and the LED light string 3.

As such, the digital power control unit 20 is able to adjust its output power based on the infrared signal sensed by the sensing-and-setting unit 10, and the brightness selection signal preset by the user, to vary the light illumination of the LED light string 3.

Figure 3:
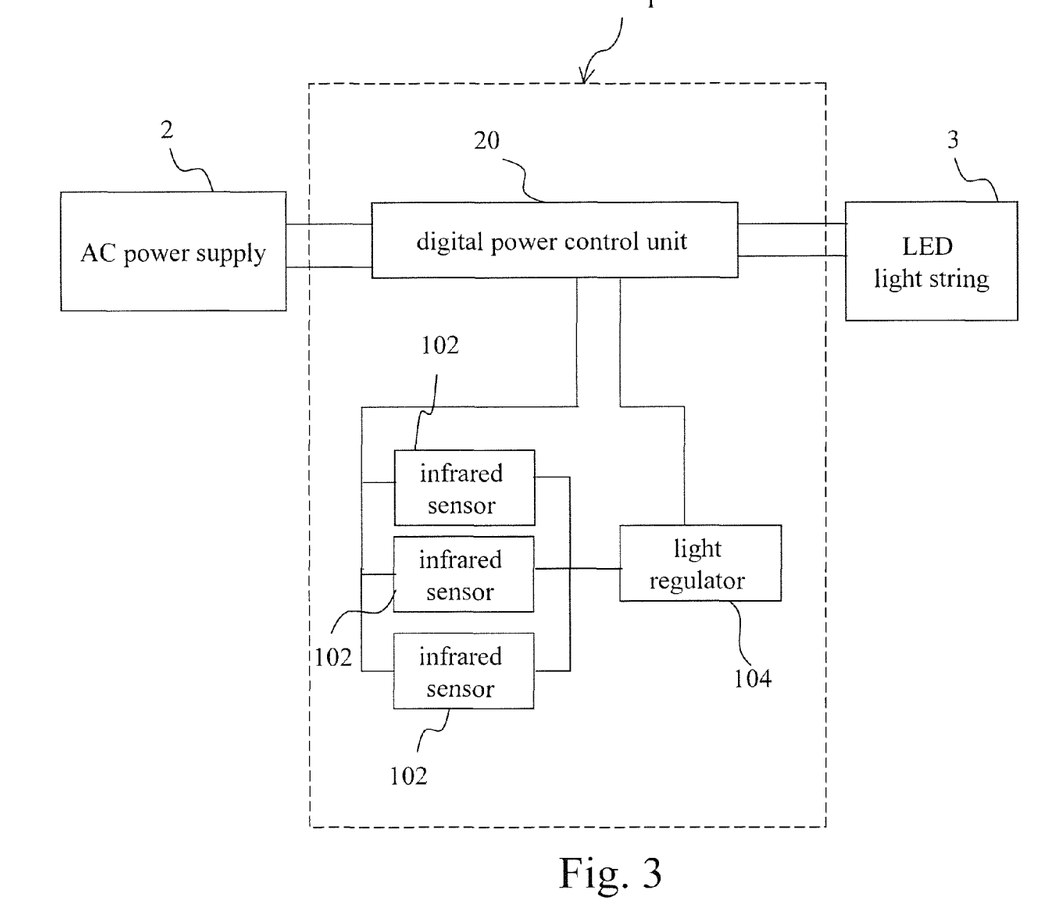
FIG. 3 is a block diagram of an automatic light regulating power supply device having a plurality of infrared sensors according to an embodiment of the present invention.

In the descriptions mentioned above, it is worth mentioning that, the sensing-and-setting unit 10 is not limited to have only a single infrared sensor 102. In other words, as shown in FIG. 3, the sensing-and-setting unit 10 may include a plurality of infrared sensors 102, to be used as the input control of a multi-sensor system. However, in the following, in explaining the technical characteristics of the present invention, the embodiment of FIG. 1 is taken as an example, yet people familiar with the technology of this field may apply it to the input control of a multi-sensor system as shown in FIG. 3, without departing from the scope of the present invention.

Figure 4:
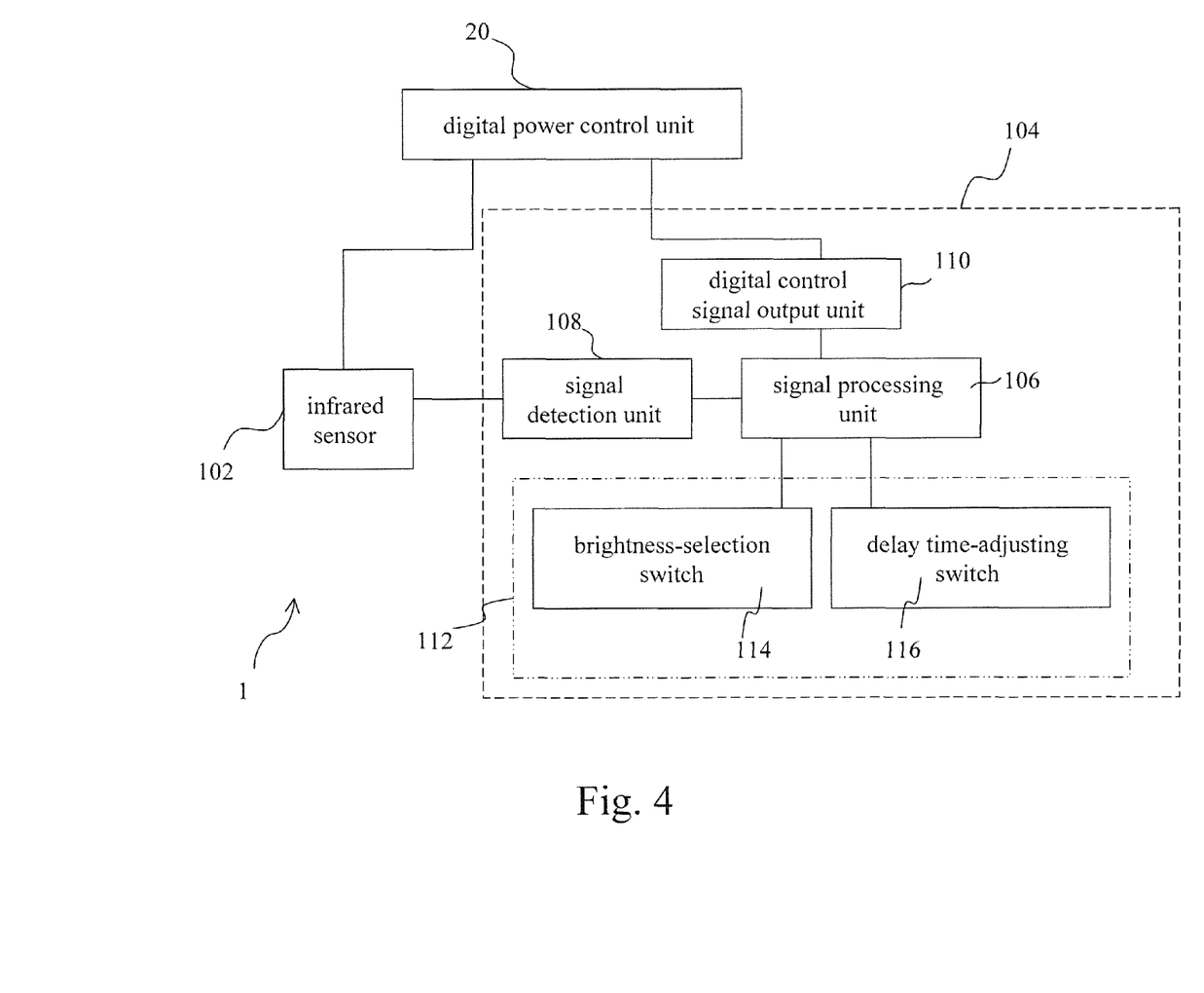
FIG. 4 is a block diagram of an automatic light regulating power supply device showing details of a light regulator according to an embodiment of the present invention.

Then, refer to FIG. 4 for a block diagram of an automatic light regulating power supply device showing details of a light regulator according to an embodiment of the present invention. As shown in FIG. 4, the light regulator 104 includes: a signal processing unit 106, a signal detection unit 108, a digital control signal output unit 110, and a brightness-setting unit 112. Wherein, the signal detection unit 108, the digital control signal output unit 110, and the brightness-setting unit 112 are connected respectively to the signal processing unit 106. The brightness-setting unit 112 includes an brightness-selection switch 114, and delay time-adjusting switch 116.

According to an embodiment of the present invention, the brightness-selection switch 114 can be set by a user to generate more than one brightness selection signals. The delay time-adjusting switch 116 may likewise be set by a user to set various delay periods corresponding to various illuminations of light emission.

The infrared sensors 102 is connected to the signal detection unit 108, such that when the brightness-setting unit 112 generates one or more brightness selection signals according to a user's setting, and the delay time corresponding to each brightness selection signal is also set through the delay time-adjusting switch 116, then the signal processing unit 106 is able to determine the regulated power to be output based on the sensing result of infrared sensors 102 and the settings of the brightness-setting unit 112, and the regulated power is output to the digital power control unit 20 via the digital control signal output unit 110. In the present invention, the digital signals output from digital control signal output unit 110 is used to control the power output from the digital power control unit 20, which is used to regulate the illumination of the LED light string 3.

By way of an example, the brightness selection signals set by a user in advance are 100%, 75%, and 50% respectively (namely, light illuminations of LED light string 3 are 100%, 75%, and 50% respectively), and when the brightness selection signal is 100%, the corresponding delay time is 1 minute; when the brightness selection signal is 75%, the corresponding delay time is 1.5 minutes; and when the brightness selection signal is 50%, the corresponding delay time is 0.5 minute. As such, when the infrared sensor 102 senses that someone is entering into its sensing range, the infrared sensor 102 will inform the digital power control unit 20 to output 100% power to the LED light string 3 to emit light for illumination.

Then, in case that the infrared sensor 102 senses that the person has left its sensing range, it will instruct the LED light string 3 to continue emitting light for a delay time of 1 minute; and after 1 minute, it will be reduced to 75% illumination automatically to continue illuminating for 1.5 minutes; and after that period, it will be reduced to 50% illumination to continue illuminating for 0.5 minute; and after that period, it will shut down automatically, in achieving stepwise light regulation.

Figure 5A:
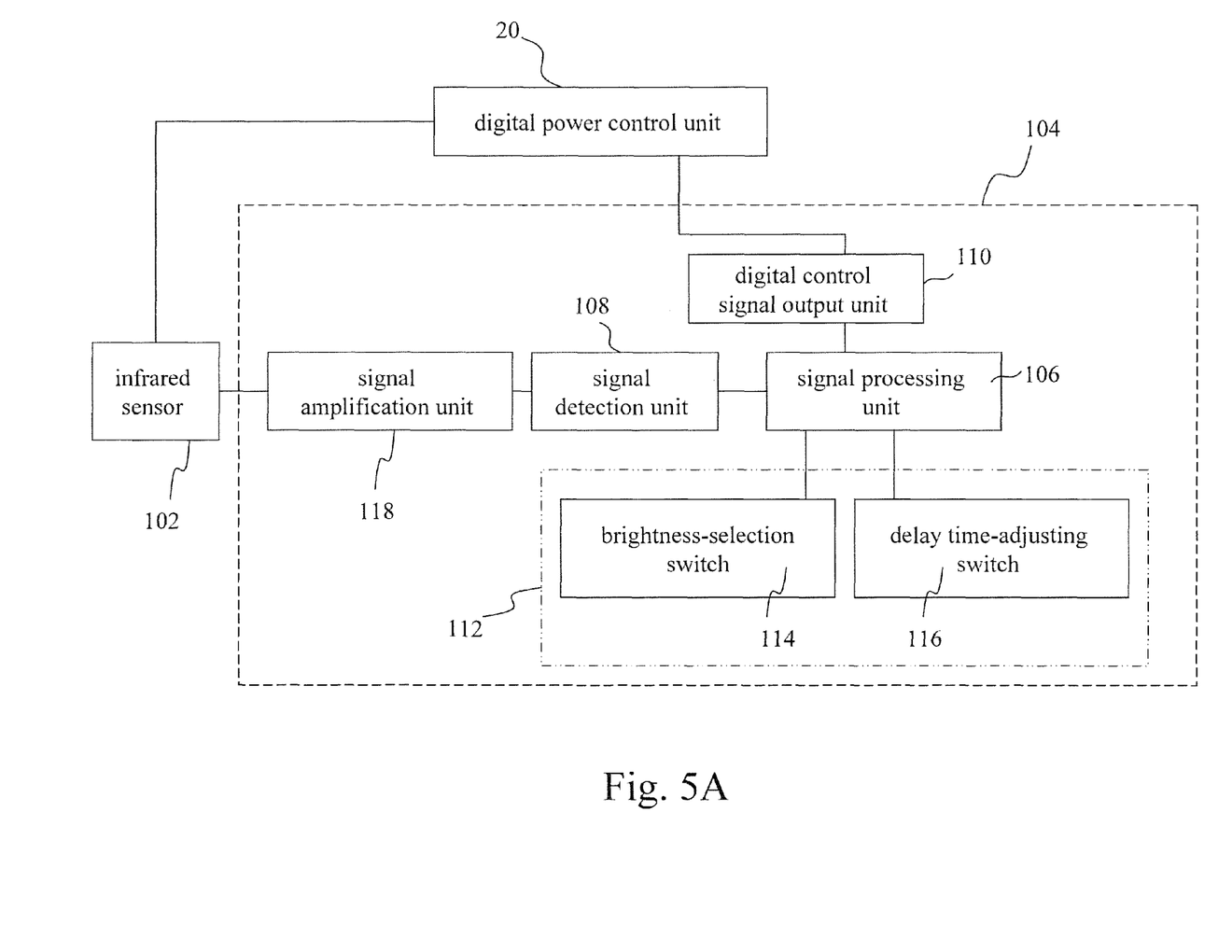
FIG. 5A is a block diagram showing a signal amplification unit integrated with a light regulator in a same light regulation module or on a same chip according to an embodiment of the present invention.
Figure 5B:
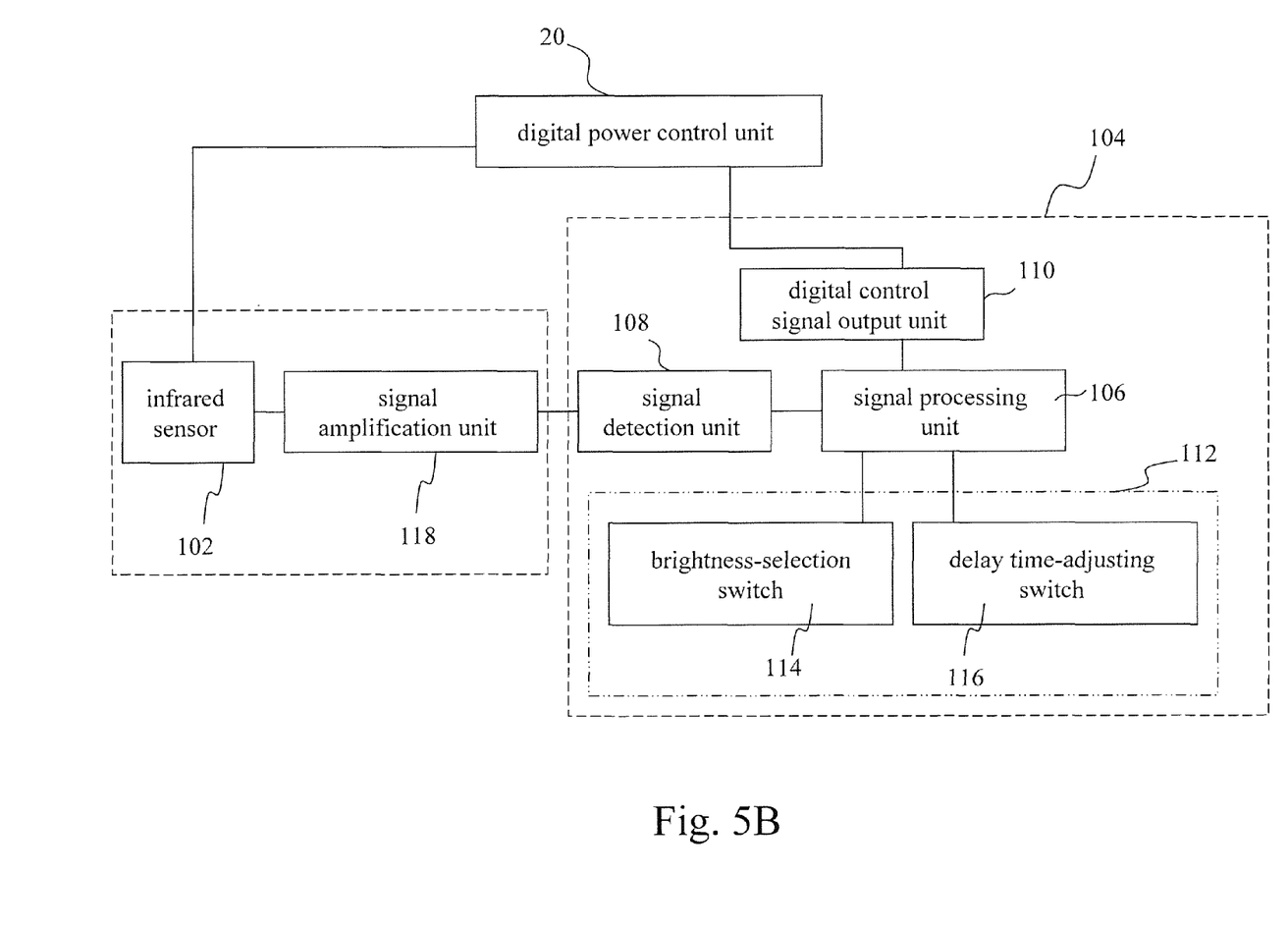
FIG. 5B is a block diagram showing a signal amplification unit integrated with an infrared sensor in a same light regulation module or on a same chip according to an embodiment of the present invention.

Moreover, in order for the infrared sensor 102 to have better infrared signal sensing capability, the sensing-and-setting unit 10 may also include a signal amplification unit 118 connected to the signal detection unit 108. Wherein, the signal amplification unit 118 may selectively be integrated with the light regulator 104 into a same light regulation module or on a same chip, as shown in FIG. 5A; or it may selectively be integrated with an infrared sensor 102 into a same light regulation module or on a same chip, as shown in FIG. 5B.

Figure 6:
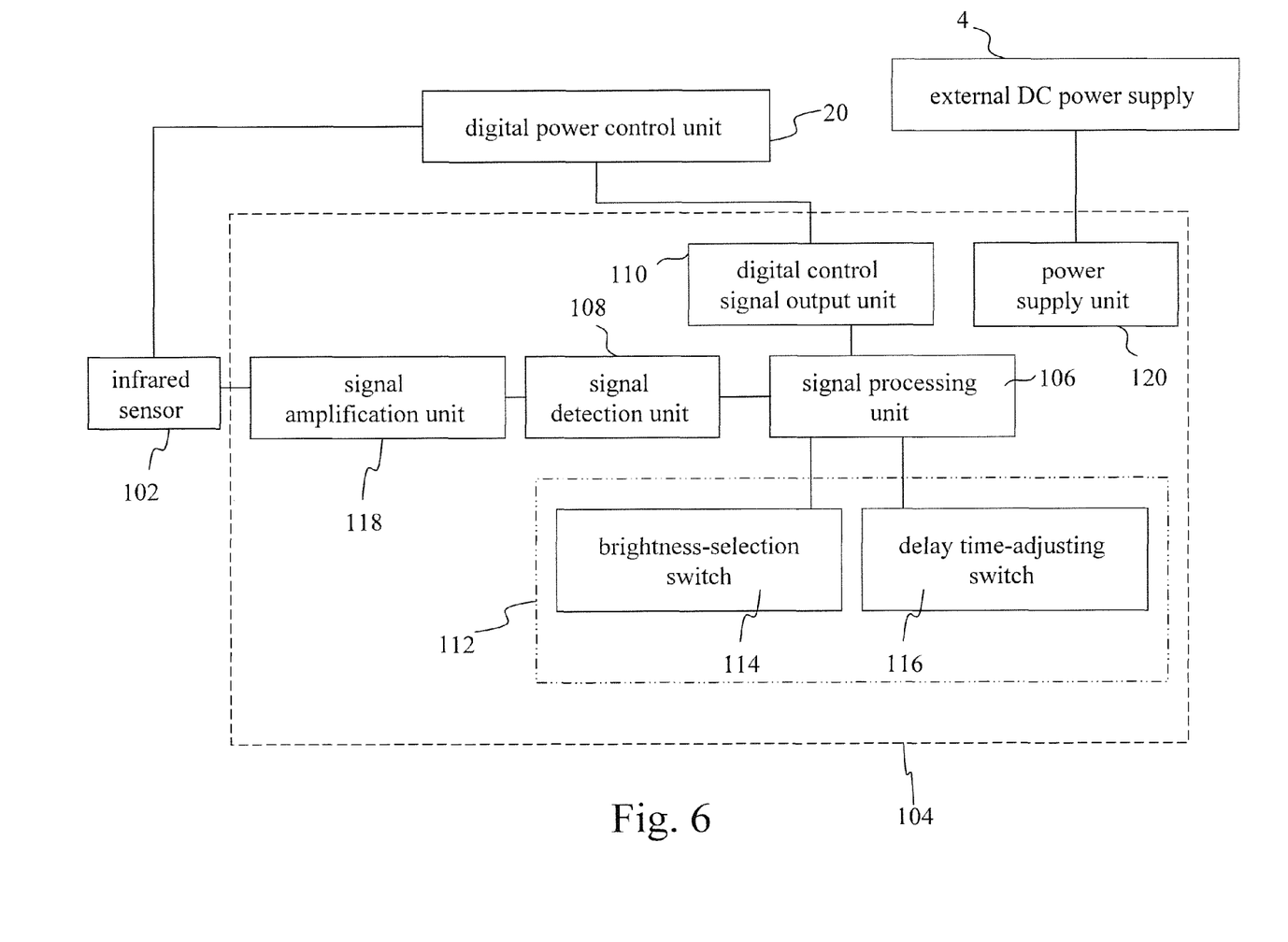
FIG. 6 is a block diagram of an automatic light regulating power supply device together with a power supply unit according to another embodiment of the present invention.

Subsequently, refer to FIG. 6 for a block diagram of an automatic light regulating power supply device together with an external power supply according to another embodiment of the present invention. As shown in FIG. 6, a power supply unit 120 connected to an external DC power supply 4 may also be provided in the light regulator 104. In this kind of design, the power required by the light regulator 104 does not have to be supplied by the digital power control unit 20, yet it can rather be supplied directly from the external DC power supply 4.

Figure 7:
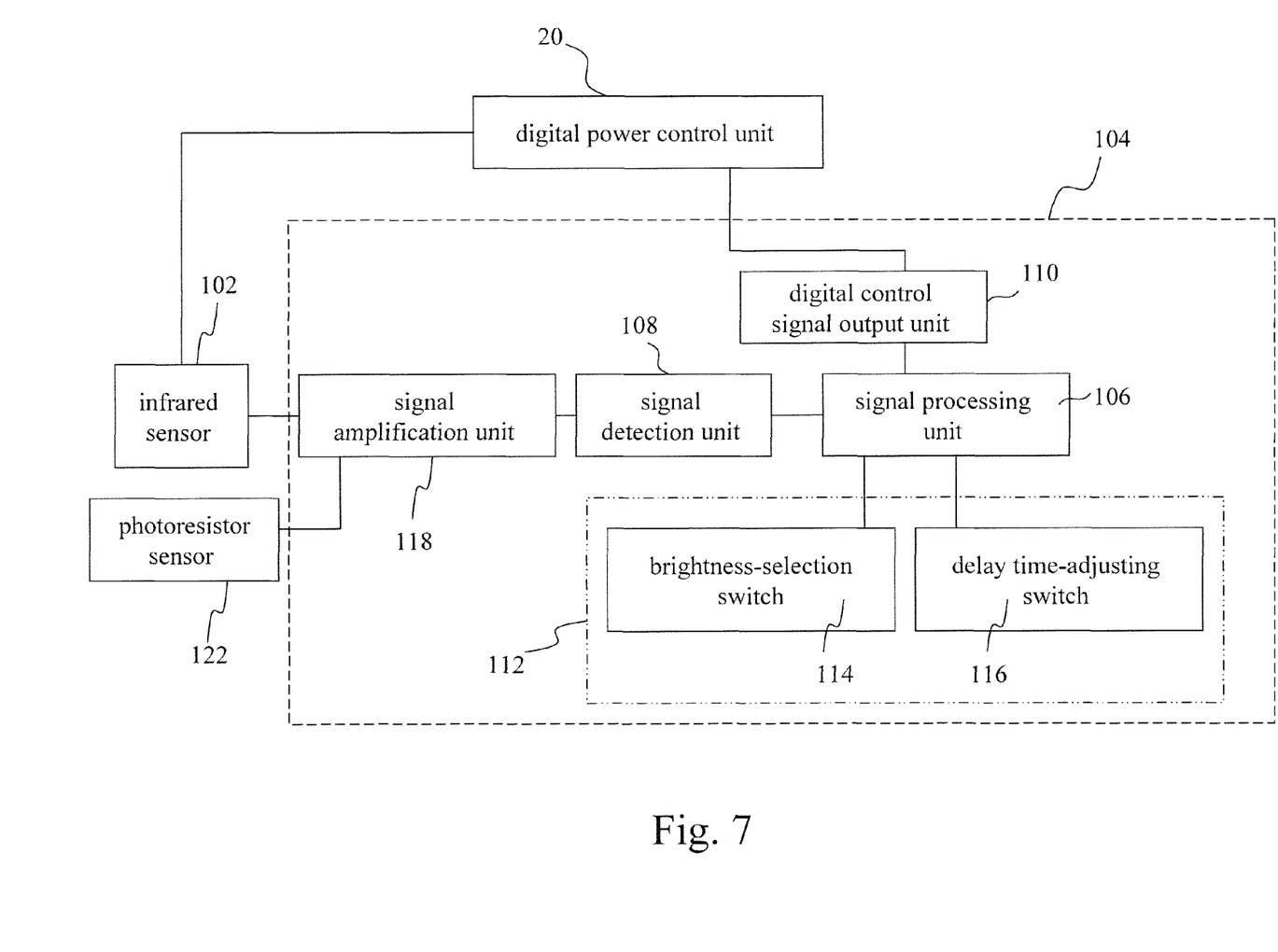
FIG. 7 is a block diagram of an automatic light regulating power supply device having a photoresistor sensor according to another embodiment of the present invention.

Furthermore, refer to FIG. 7 for a block diagram of an automatic light regulating power supply device having a photoresistor sensor according to another embodiment of the present invention. As shown in FIG. 7, in addition to the infrared sensor 102, the sensing-and-setting unit 10 may also includes a photoresistor sensor 122 for sensing a sensed signal. In general, the photoresistor sensor is very sensitive to the environment lights. In the present embodiment, the photoresistor sensor is used to sense the illumination of the surroundings, to stepwise regulate the illumination of the LED light string 3, in achieving energy conservation and low power consumption.

As mentioned above, when the photoresistor sensor 122 senses that the environment illumination is lower than a preset value (for example, after dark), then the photoresistor sensor 122 may first inform the digital power control unit 20 to provide 100% power output to the LED light string 3 to emit light for illumination. Afterwards, it may proceed with further stepwise light regulation as mentioned before based on the sensing result of the infrared sensor 102 (for example, if any one passes by).

Figure 8:
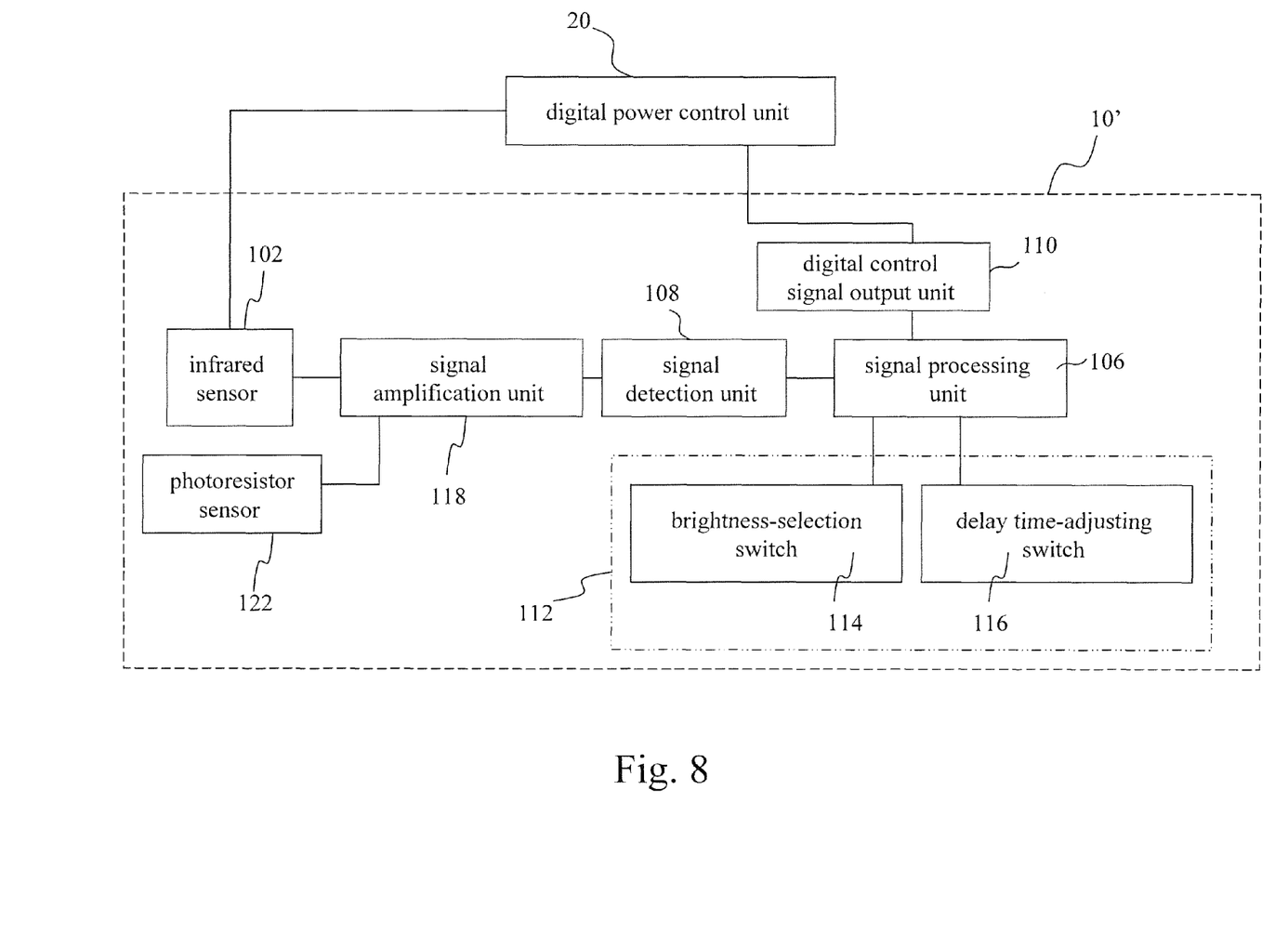
FIG. 8 is a block diagram of an automatic light regulating power supply device integrated on a single system chip according to another embodiment of the present invention.

Then, refer to FIG. 8 for a block diagram of an automatic light regulating power supply device integrated on a single system chip according to another embodiment of the present invention. As shown in FIG. 8, all the components mentioned above (the signal processing unit 106, the signal detection unit 108, the digital control signal output unit 110, the brightness-setting unit 112, the signal amplification unit 118, the infrared sensor 102, and the photoresistor sensor 122) can be selectively disposed in a light regulation module on a single system on chip (SOC) 10', to achieve system integration.

Figure 9:
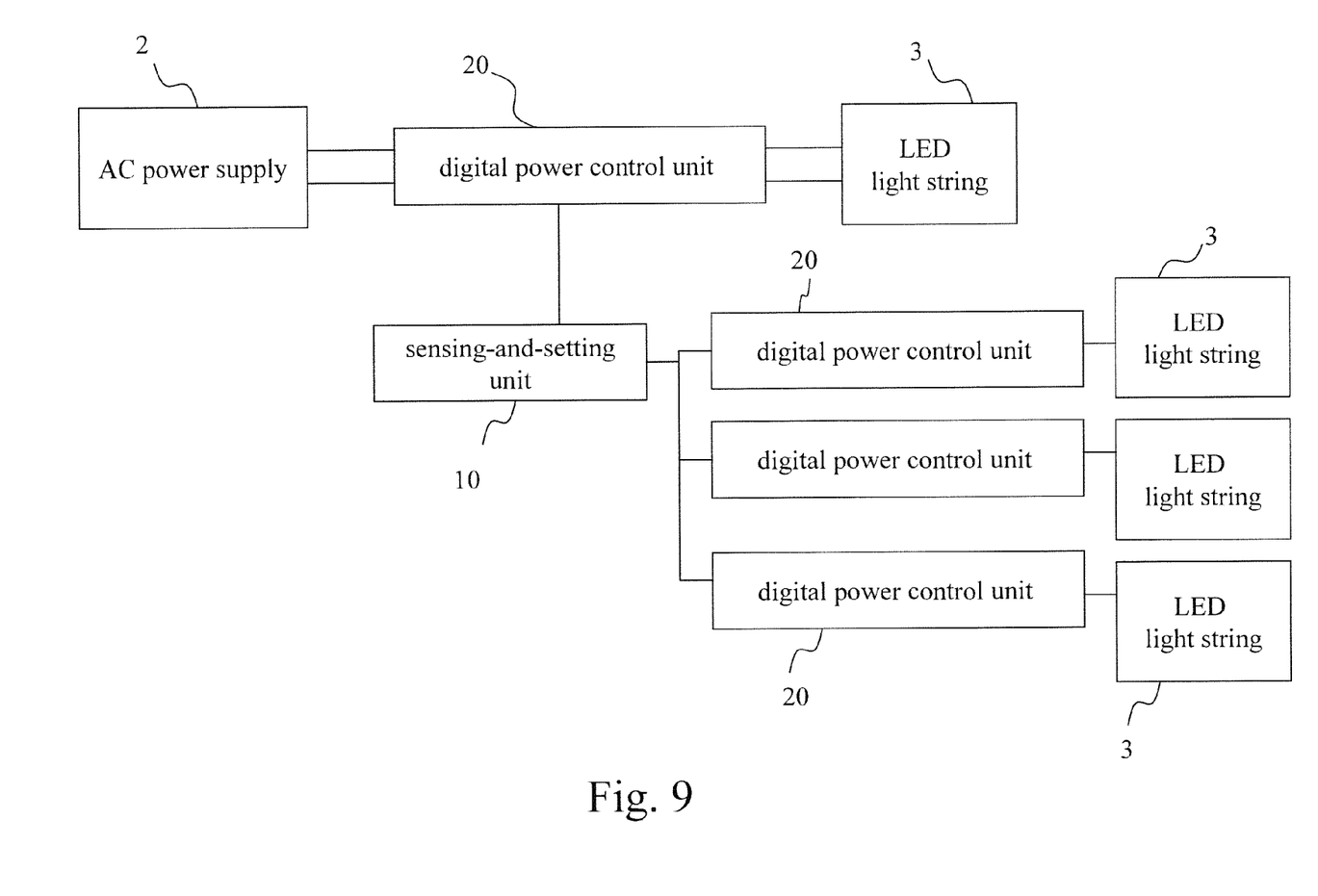
FIG. 9 is a block diagram of an automatic light regulating power supply device arranged in a group control way according to an embodiment of the present invention.

Moreover, the automatic light regulating power supply device may be implemented in a group control approach. Refer to FIG. 9 for a block diagram of an automatic light regulating power supply device arranged in a group control approach according to an embodiment of the present invention. As shown in FIG. 9, the sensing-and-setting unit 10 can be connected to a plurality of the digital power control units 20 and each of the digital power control units 20 is connected to a LED light string 3. Therefore, via the digital power control units 20, light illumination of the LED light strings 3 can be well controlled, in achieving the effect of group control.

Figure 10:
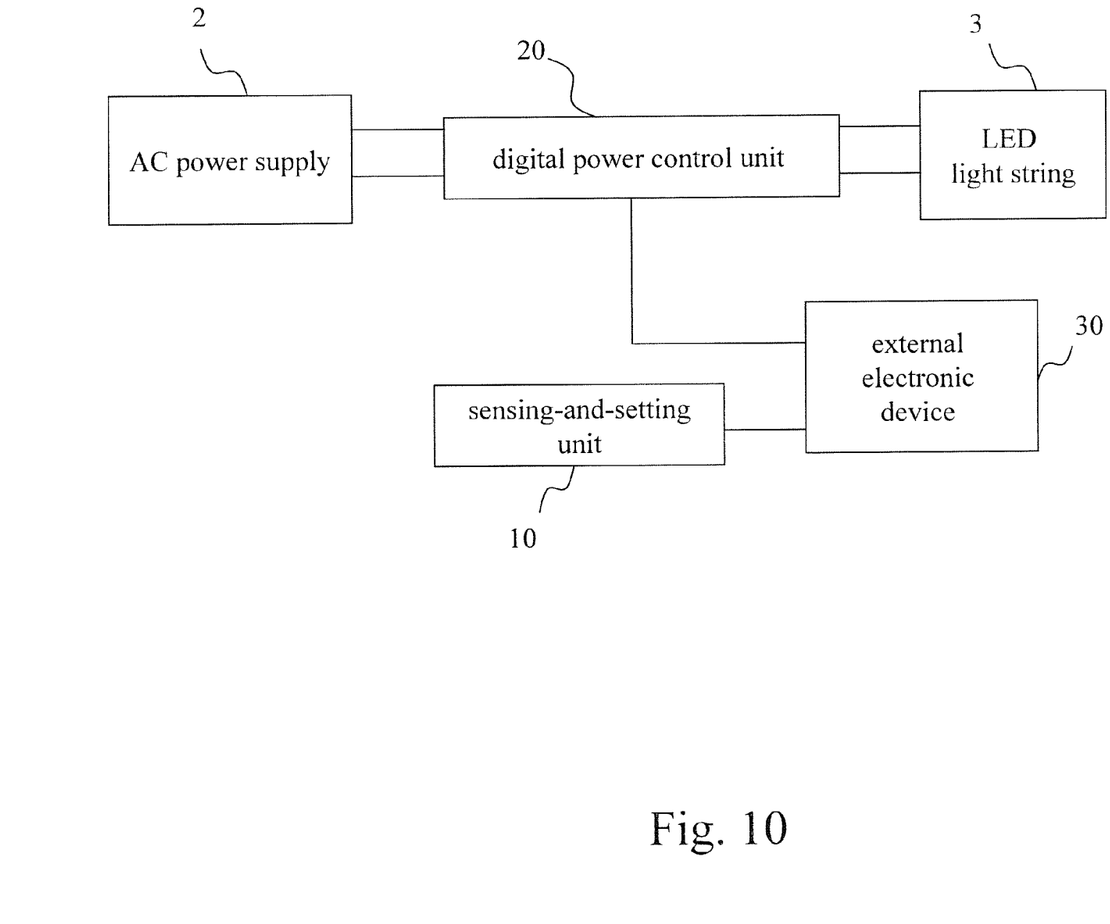
FIG. 10 is a block diagram of an automatic light regulating power supply device including an external electronic device according to an embodiment of the present invention.

Finally, refer to FIG. 10 for a block diagram of an automatic light regulating power supply device connected to an AC power supply and an external electronic device according to an embodiment of the present invention. As shown in FIG. 10, the automatic light regulating power supply device may also include an external electronic device 30 connected between the sensing-and-setting unit 10 and the digital power control unit 20. Such an external electronic device 30 can be a personal computer, a personal digital assistant, or a mobile phone. The external electronic device 30 is able to receive signals from the sensing-and-setting unit 10 for processing, and then it informs the digital power control unit 20 to regulate its output power to control the light illumination of the LED light string 3.

Summing up the above, the automatic light regulating power supply device of the present invention is an intelligent device, that is able to directly use the local AC power supply, to control the illumination regulation of LED light string. Through the application of various components mentioned above, the present invention is able to utilize the direct local AC power supply effectively to realize stepwise light regulation without the need of using any costly sensing instruments and/or additional power conversion device.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An automatic light regulating power supply device, connected between an AC power supply and a light-emitting-diode (LED) light string, to drive said LED light string to emit light, comprising:
    a sensing-and-setting unit, for sensing an infrared signal, and generating a plurality of brightness selection signals; and
    a digital power control unit, in which is provided with an AC/DC conversion circuit, to convert the AC power supply into a DC power and output said DC power, said digital power control unit is connected to said sensing-and-setting unit, and regulates its output power based on the infrared signal sensed by said sensing-and-setting unit and said brightness selection signals, to vary illumination of said LED light string;
    wherein said sensing-and-setting unit includes:
    a light regulator, in which is provided with a signal processing unit, a signal detection unit, a digital control signal output unit, and a brightness-setting unit, wherein, said signal detection unit, said digital control signal output unit, and said brightness-setting unit are connected respectively to said signal processing unit, said brightness-setting unit generates said brightness selection signals, and each of said brightness selection signals corresponds to a delay time; and
    at least one infrared sensor, connected to said signal detection unit, so that said signal processing unit regulates the output power of said digital control signal output unit, based on sensing results of said infrared sensor and said delay time corresponding to said brightness selection signal, to vary illumination of said LED light string.

2. The automatic light regulating power supply device as claimed in claim 1, wherein said light regulator further includes a power supply unit connected to an external DC power supply.

3. The automatic light regulating power supply device as claimed in claim 1, wherein said sensing-and-setting unit further includes a signal amplification unit, connected to said signal detection unit, to amplify said sensing results of said infrared sensor.

4. The automatic light regulating power supply device as claimed in claim 3, wherein said signal amplification unit, is selectively disposed in said light regulator or with said infrared sensor.

5. The automatic light regulating power supply device as claimed in claim 1, wherein said sensing-and-setting unit further includes a photoresistor sensor, for sensing a sensed signal.

6. The automatic light regulating power supply device as claimed in claim 1, wherein said brightness-setting unit includes:
    a brightness-selection switch, for generating said brightness selection signals; and
    a delay time-adjusting switch, for generating said delay time each corresponding to one of said brightness selection signals.

7. The automatic light regulating power supply device as claimed in claim 1, wherein said light regulator and said infrared sensor are selectively disposed on a single chip.

8. The automatic light regulating power supply device as claimed in claim 1, wherein said digital power control unit further includes: a low voltage power supply circuit connected to said AC/DC conversion circuit; an output power control signal processing unit connected to said sensing-and-setting unit; an output power conversion and filtering circuit connected to said LED light string; and an output power control unit, wherein, said AC/DC conversion circuit is connected to said output power control unit, said low voltage power supply circuit, and said AC power supply, and said output power control unit is connected to the AC/DC conversion circuit, said output power conversion and filtering circuit, and said output power control signal processing unit.

9. The automatic light regulating power supply device as claimed in claim 8, wherein said AC/DC conversion circuit includes an EMI filter circuit, a rectifying circuit, and a power factor adjusting circuit, said EMI filter circuit is connected to said AC power supply, said power factor adjusting circuit is connected to said output power control unit, and said rectifying circuit is connected between said EMI filter circuit and said power factor adjusting circuit.

10. The automatic light regulating power supply device as claimed in claim 8, wherein said digital power control unit further includes: a detection signal conversion circuit, an overcurrent detection circuit, and an overvoltage detection circuit, said detection signal conversion circuit is connected to said output power control signal processing unit, said overcurrent detection circuit and said the overvoltage detection circuit are connected in parallel, and each of them is connected to said detection signal conversion circuit, said output power conversion and filtering circuit, and said LED light string.

11. The automatic light regulating power supply device as claimed in claim 1, wherein the sensing-and-setting unit is connected to a plurality of said digital power control units, to control illumination of said LED light string through each said digital power control unit.

12. The automatic light regulating power supply device as claimed in claim 1, further comprising:
    an external electronic device connected between said sensing-and-setting unit and said digital power control unit, such that illumination of said LED light string is controlled through said external electronic device.

13. An automatic light regulating power supply device, connected between an AC power supply and a light-emitting-diode (LED) light string, to drive said LED light string to emit light, comprising:
    a sensing-and-setting unit, for sensing an infrared signal, and generating a plurality of brightness selection signals; and
    a digital power control unit, in which is provided with an AC/DC conversion circuit, to convert the AC power supply into a DC power and output said DC power, said digital power control unit is connected to said sensing-and-setting unit, and regulates its output power based on the infrared signal sensed by said sensing-and-setting unit and said brightness selection signals, to vary illumination of said LED light string;
    wherein said digital power control unit further includes:
    a low voltage power supply circuit connected to said AC/DC conversion circuit;

an output power control signal processing unit connected to said sensing-and-setting unit;
an output power conversion and filtering circuit connected to said LED light string; and
an output power control unit,
wherein, said AC/DC conversion circuit is connected to said output power control unit, said low voltage power supply circuit, and said AC power supply, and said output power control unit is connected to the AC/DC conversion circuit, said output power conversion and filtering circuit, and said output power control signal processing unit.

14. The automatic light regulating power supply device as claimed in claim 13, wherein said AC/DC conversion circuit includes an EMI filter circuit, a rectifying circuit, and a power factor adjusting circuit, said EMI filter circuit is connected to said AC power supply, said power factor adjusting circuit is connected to said output power control unit, and said rectifying circuit is connected between said EMI filter circuit and said power factor adjusting circuit.

15. The automatic light regulating power supply device as claimed in claim 13, wherein said digital power control unit further includes: a detection signal conversion circuit, an overcurrent detection circuit, and an overvoltage detection circuit, said detection signal conversion circuit is connected to said output power control signal processing unit, said overcurrent detection circuit and said the overvoltage detection circuit are connected in parallel, and each of them is connected to said detection signal conversion circuit, said output power conversion and filtering circuit, and said LED light string.

16. The automatic light regulating power supply device as claimed in claim 13, wherein said sensing-and-setting unit includes:
a light regulator, in which is provided with a signal processing unit, a signal detection unit, a digital control signal output unit, and a brightness-setting unit, wherein, said signal detection unit, said digital control signal output unit, and said brightness-setting unit are connected respectively to said signal processing unit, said brightness-setting unit generates said brightness selection signals, and each of said brightness selection signals corresponds to a delay time, said light regulator further includes a power supply unit connected to an external DC power supply; and
at least one infrared sensor, connected to said signal detection unit, so that said signal processing unit regulates the output power of said digital control signal output unit, based on sensing results of said infrared sensor and said delay time corresponding to said brightness selection signal, to vary illumination of said LED light string.

17. The automatic light regulating power supply device as claimed in claim 13, wherein said sensing-and-setting unit includes:
a light regulator, in which is provided with a signal processing unit, a signal detection unit, a digital control signal output unit, and a brightness-setting unit, wherein, said signal detection unit, said digital control signal output unit, and said brightness-setting unit are connected respectively to said signal processing unit, said brightness-setting unit generates said brightness selection signals, and each of said brightness selection signals corresponds to a delay time;
at least one infrared sensor, connected to said signal detection unit, so that said signal processing unit regulates the output power of said digital control signal output unit, based on sensing results of said infrared sensor and said delay time corresponding to said brightness selection signal, to vary illumination of said LED light string; and
a signal amplification unit, connected to said signal detection unit, to amplify said sensing results of said infrared sensor.

18. The automatic light regulating power supply device as claimed in claim 17, wherein said signal amplification unit, is selectively disposed in said light regulator or with said infrared sensor.

19. The automatic light regulating power supply device as claimed in claim 13, wherein said sensing-and-setting unit includes:
a light regulator, in which is provided with a signal processing unit, a signal detection unit, a digital control signal output unit, and a brightness-setting unit, wherein, said signal detection unit, said digital control signal output unit, and said brightness-setting unit are connected respectively to said signal processing unit, said brightness-setting unit generates said brightness selection signals, and each of said brightness selection signals corresponds to a delay time;
at least one infrared sensor, connected to said signal detection unit, so that said signal processing unit regulates the output power of said digital control signal output unit, based on sensing results of said infrared sensor and said delay time corresponding to said brightness selection signal, to vary illumination of said LED light string; and
a photoresistor sensor, for sensing a sensed signal.

20. The automatic light regulating power supply device as claimed in claim 13, wherein said sensing-and-setting unit includes:
a light regulator, in which is provided with a signal processing unit, a signal detection unit, a digital control signal output unit, and a brightness-setting unit, wherein, said signal detection unit, said digital control signal output unit, and said brightness-setting unit are connected respectively to said signal processing unit, said brightness-setting unit generates said brightness selection signals, and each of said brightness selection signals corresponds to a delay time; and
at least one infrared sensor, connected to said signal detection unit, so that said signal processing unit regulates the output power of said digital control signal output unit, based on sensing results of said infrared sensor and said delay time corresponding to said brightness selection signal, to vary illumination of said LED light string;
wherein said brightness-setting unit includes:
a brightness-selection switch, for generating said brightness selection signals; and
a delay time-adjusting switch, for generating said delay time each corresponding to one of said brightness selection signals.

21. The automatic light regulating power supply device as claimed in claim 13, wherein said sensing-and-setting unit includes:
a light regulator, in which is provided with a signal processing unit, a signal detection unit, a digital control signal output unit, and a brightness-setting unit, wherein, said signal detection unit, said digital control signal output unit, and said brightness-setting unit are connected respectively to said signal processing unit, said brightness-setting unit generates said brightness selection signals, and each of said brightness selection signals corresponds to a delay time; and
at least one infrared sensor, connected to said signal detection unit, so that said signal processing unit regulates the output power of said digital control signal output unit, based on sensing results of said infrared sensor and said delay time corresponding to said brightness selection signal, to vary illumination of said LED light string;
wherein said light regulator and said infrared sensor are selectively disposed on a single chip.

22. The automatic light regulating power supply device as claimed in claim 13, wherein the sensing-and-setting unit is connected to a plurality of said digital power control units, to control illumination of said LED light string through each said digital power control unit.

23. The automatic light regulating power supply device as claimed in claim 13, further comprising:
an external electronic device connected between said sensing-and-setting unit and said digital power control unit, such that illumination of said LED light string is controlled through said external electronic device.

* * * * *